UNITED STATES PATENT OFFICE.

EDWARD A. BARNES, OF SOUTH SAN FRANCISCO, CALIFORNIA.

PROCESS FOR PREPARING BARIUM HYDROXID FROM BARIUM SULFID.

1,316,133.  Specification of Letters Patent.  Patented Sept. 16, 1919.

No Drawing.  Application filed February 7, 1918.  Serial No. 215,787.

*To all whom it may concern:*

Be it known that I, EDWARD A. BARNES, a subject of the King of England, residing at South San Francisco, in the county of San Mateo and State of California, have invented new and useful Improvements in Processes for Preparing Barium Hydroxid from Barium Sulfid, of which the following is a specification.

This invention relates to the preparation of barium hydroxid or barium hydrate, $Ba(OH)_2$, from barium sulfid, BaS, and its separation in a pure state in readiness for such further uses and combinations as may be desired.

It consists in subjecting a solution of barium sulfid to a reduction of temperature, whereby the barium hydroxid will be crystallized out from the solution in a substantially pure condition.

In carrying out my process, I take a solution of barium sulfid of from 8° to 10° Baumé gravity, and a temperature of from 15° to 20° centigrade, and rapidly cool and agitate it until the temperature is reduced to between 0° and 5° centigrade. Under this condition almost pure crystals of barium hydroxid will be deposited and may be separated from the sulfid solution.

This product may be further purified by washing with a saturated solution of barium hydroxid of the same temperature, thus eliminating the last trace of the more soluble sulfhydrate. The purification may also be effected by re-crystallization with or without the aid of cooling solutions. If, however, solutions of a strength above 10° Baumé be employed, the barium hydrate will be contaminated with barium sulfid in proportion to increasing strength employed. On the other hand if solutions of a strength below 8° Baumé are used, too small a proportion of pure hydroxid is obtainable. On drying the crystallized barium hydroxid in air which is free from carbonic acid, or *in vacuo*, the dehydrated barium hydroxid $Ba(OH)_2$ is obtained in absolutely pure form and can be used for the production of absolutely pure barium peroxid ($BaO_2$) by the usual methods.

By this process barium hydroxid can be produced much more economically than by the existing technical methods.

Having thus described my invention, what I claim and desire to secure by Letters Patent is—

1. The process of manufacturing barium hydroxid which consists in rapidly cooling a sulfid solution of barium to a temperature where crystals of barium hydroxid are formed.

2. The process of manufacturing barium hydroxid which consists in subjecting a sulfid solution of barium having a temperature of from 15° to 20° C. to a rapid cooling action to crystallize the barium hydroxid and then separating the crystals from the solution.

3. The process of manufacturing barium hydroxid which consists in subjecting a sulfid solution of barium having a temperature of from 15° to 20° C. to a rapid cooling action to crystallize the barium hydroxid, then separating the crystals from the solution and drying the same under a partial vacuum.

4. The process of manufacturing barium hydroxid which consists in subjecting a sulfid solution of barium to a cooling action which rapidly reduces its temperature to approximately 5° C., thereby causing crystallization of the barium hydroxid, subjecting the solution to agitation while it is being cooled and then separating the crystals from the solution.

5. The process of producing barium hydroxid from barium sulfid, consisting in subjecting a solution of barium sulfid of a strength of from 8° to 10° Baumé and a temperature of from 15° to 20° centigrade to a rapid agitation and a reduction of temperature to approximately between 0° and 5° centigrade and crystallizing from the solution the barium hydroxid.

6. The process of producing barium hydroxid from a barium sulfid solution, consisting in subjecting a solution of barium sulfid of a strength of from 8° to 10° Baumé and a temperature of from 15° to 20° centigrade to a rapid agitation and a reduction of temperature to approximately between 0° and 5° centigrade and crystallizing from the solution the barium hydroxid, and finally drying the crystalline product in an atmosphere free from carbonic acid.

In testimony whereof I have hereunto set my hand in the presence of two subscribing witnesses.

EDWARD A. BARNES.

Witnesses:
BENJAMIN HENRY TRUAX,
DANIEL MCSWEENEY.